July 31, 1923.  
J. YOUNG ET AL  
TRANSMISSION RELEASE  
Filed Oct. 2, 1922  
1,463,237  
2 Sheets-Sheet 2
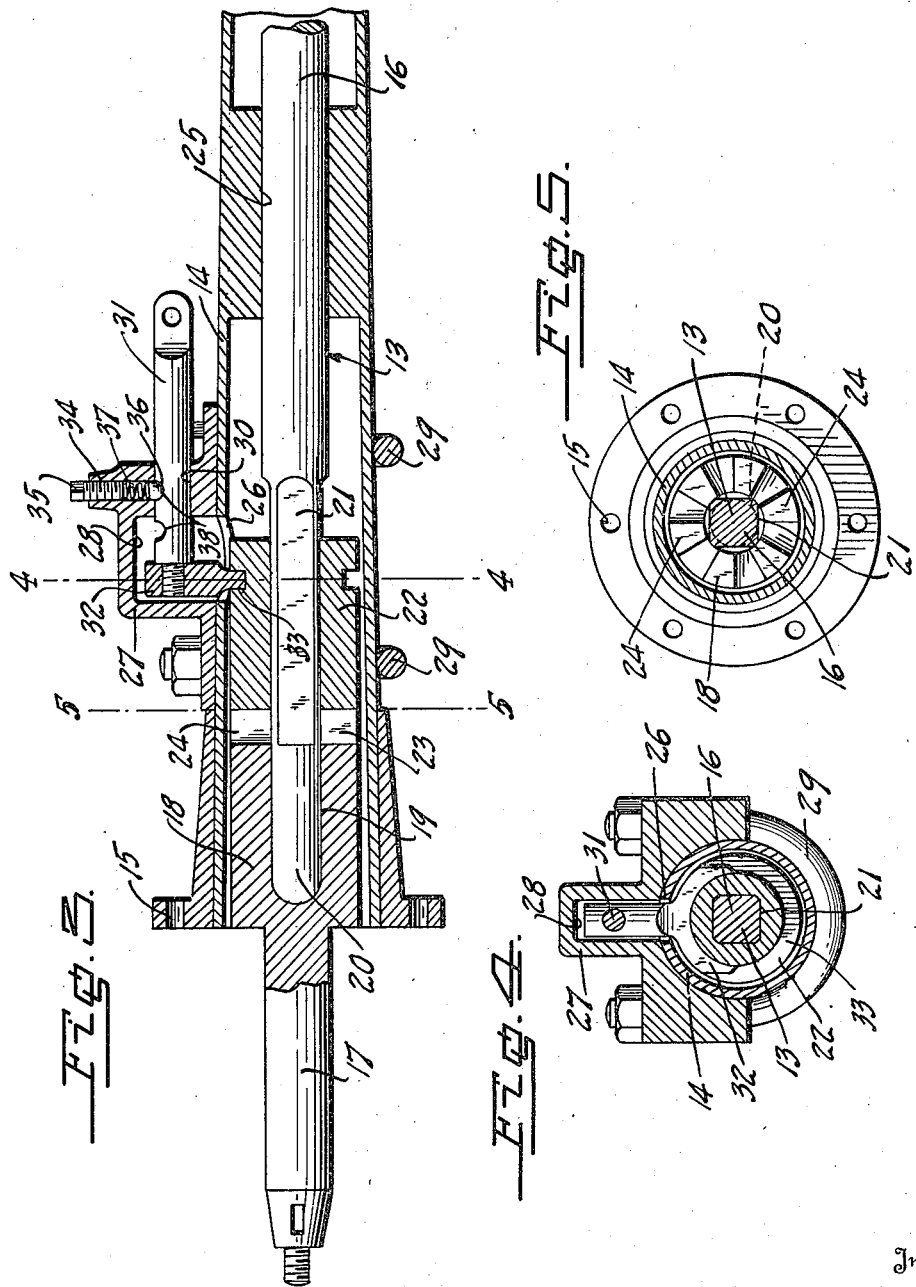
Inventors  
Jacob Young  
Merton L. Frakes  
By Watson E. Coleman  
Attorney Patented July 31, 1923.

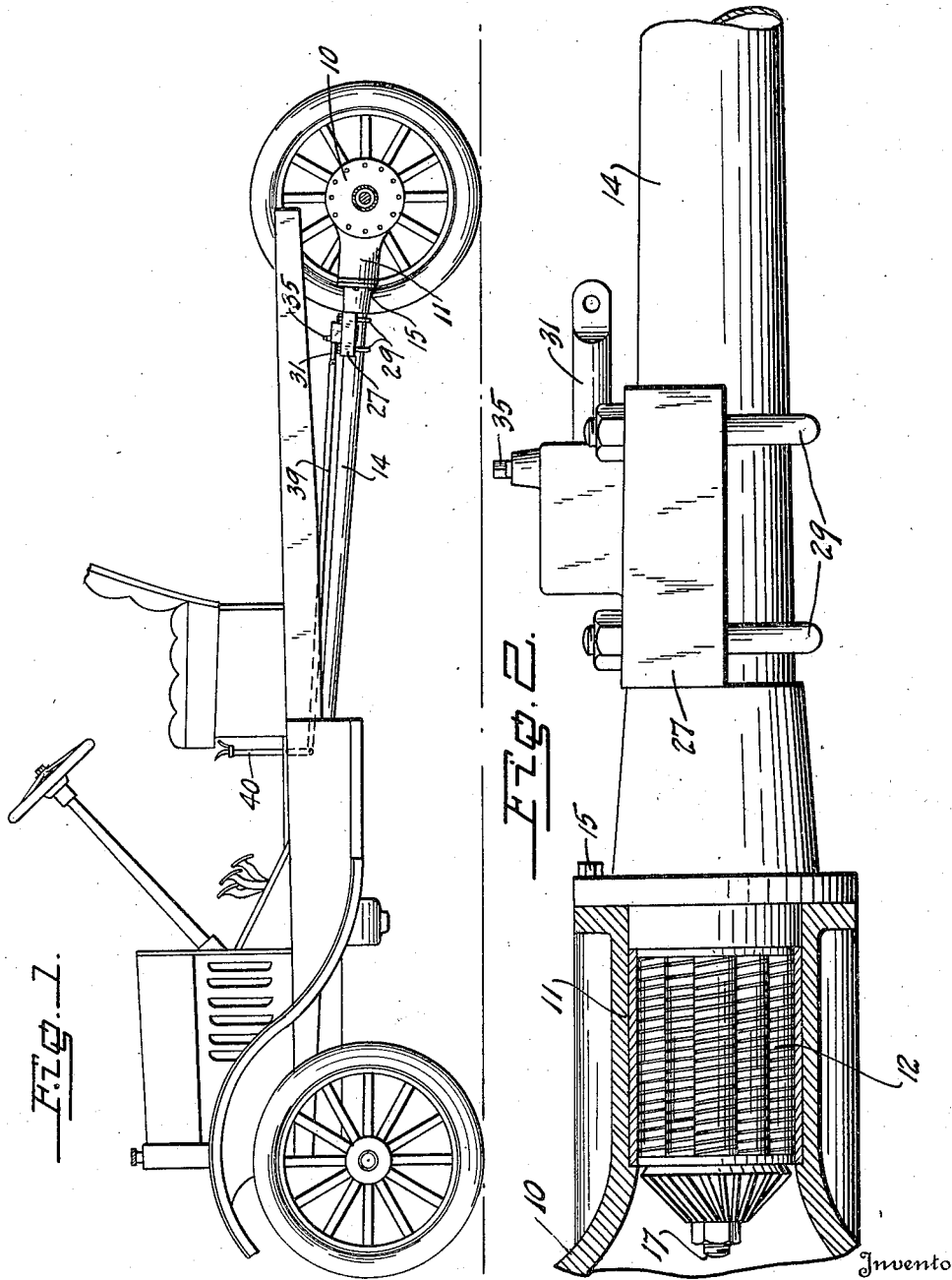

1,463,237

UNITED STATES PATENT OFFICE.

JACOB YOUNG AND MERTON L. FRAKES, OF HENNESSEY, OKLAHOMA.

TRANSMISSION RELEASE.

Application filed October 2, 1922. Serial No. 591,873.

*To all whom it may concern:*

Be it known that we, JACOB YOUNG and MERTON L. FRAKES, citizens of the United States, residing at Hennessey, in the county of Kingfisher and State of Oklahoma, have invented certain new and useful Improvements in Transmission Releases, of which the following is a specification, reference being had to the accompanying drawings.
This invention relates to transmission releases, and more particularly to a device adapted to disconnect the transmission and drive axles of a self-propelled vehicle.

As is well known to those familiar with the art, in certain types of vehicles now placed upon the market, friction clutches are employed connecting the transmission gearing with the drive axles, these friction clutches being operated from the engine of the vehicle. Often these clutches will have their faces, when the clutch is in what is known as the out position, so closely related that a certain amount of drive is transmitted to the rear axle, resulting either in the driving of the rear axle and a consequent slow forward movement of the car, or in intense friction being set up in the clutch tending to wear upon the clutch and cause a braking action upon the engine, preventing proper idling of the engine and consequently resulting in not only wear upon the clutch but in the loss of fuel due to the excessive speed at which the engine must be driven when idling.
An important object of this invention is to provide a drive shaft construction for vehicles of this type embodying a clutch permitting complete disconnection of the transmission from the differential and preventing the results above set forth.

A further object of the invention is to provide a device of this character which may be employed to replace the ordinary drive axle construction without in any manner changing the construction of either the differential or transmission.

An additional object of the invention is to provide a device of this character which may be very cheaply produced, is simple in its operation, durable in service, and a general improvement in the art.

These and other objects we attain by the construction and arrangement shown in the accompanying drawings wherein for the purpose of illustration is shown a preferred embodiment of our invention and wherein like reference characters designate like parts throughout.

In the drawings:—

Figure 1 is a side elevation of an automobile chassis showing a transmission release constructed in accordance with our invention applied thereto;

Figure 2 is an enlarged detail view partially in section showing the positioning of the device upon the torque tube;

Figure 3 is a longitudinal sectional view through the torque tube and shaft; and Figures 4 and 5 are sections on the line 4—4 and 5—5 of Figure 3 respectively.

Referring now more particularly to the drawings, the numeral 10 indicates the differential housing of a well known make of car, having the forward extension 11 containing a bearing 12 in which the rear end of the drive shaft 13 rotates. The numeral 14 designates the shaft housing or torque tube in which the shaft 13 is arranged and which has its rear end provided with means, as at 15, whereby it may be secured to the transmission housing at the forward extension 11 thereof. In accordance with our invention, the shaft 13 is formed in two sections, 16 and 17, the section 17 rotating in the bearing 12 hereinbefore mentioned and being provided at its forward end with an enlargement 18 rotating within the rear end of the torque tube 14. The forward end of this enlargement 18 has formed therein a bore 19 forming a bearing for the rear extremity of the forward shaft section 16, the rear end portion of this shaft being circular in cross section, as indicated at 20.

Forwardly of the circular section 20 the shaft 16 is squared or has splined thereto, as at 21, a shifting block 22. This block is provided upon its rear face with teeth 23 adapted to engage similar teeth 24 formed upon the front face of the enlargement 18 about the bore 19 thereof. The shaft section 16 forwardly of the squared portion 21 is preferably extended through a bearing 25 maintaining the shaft section 16 in alignment with the shaft section 17 so as to permit ready engagement of the end 20 of the shaft section 16 in the bore 19 of the enlargement 18. It will be seen that when the teeth of the enlargement 18 and the block 22 are in engagement, the shaft sections 16 and 17 are locked against rotation and when the teeth of these portions are withdrawn from engagement, the shaft section 16 may rotate independently of the shaft section 17.

Formed in the torque tube 14 adjacent the block 22 is an opening 26 and a saddle shaped casting 27 is mounted upon the torque tube about this opening and has formed therein a recess 28 communicating with the opening. The casting 27 is held in position by suitable clamps 29 shown in the present instance as U bolts. Formed in the forward wall of the casting 27, which is relatively thickened, is a bore 30 substantially paralleling the torque tube and communicating with the recess 28 of the casting. Through this bore slidably extends a shifting shaft 31, the rear end of which has threaded engagement with the shank of a shifting fork 32 having its arms engaged in a groove 33 formed in the block 22.

It will be seen that upon shifting of the shaft 31 the block 22 may be moved to bring the teeth thereof into or out of engagement with the teeth of the enlargement 18 and accordingly to control the connection of the shaft sections 16 and 17. In order that the block 22 may be held against movement when in adjusted positions, the forward wall, which as hereinbefore stated is relatively thickened, has formed therein a bore 34 at right angles to the bore 30 and the outer end of this bore has adjustably mounted therein a threaded plug 35. Against the shaft within the bore 34 a ball locking member 36 abuts and is held in engagement with the shaft through medium of a spring 37 disposed within the bore. The shaft 31 is provided with spaced notches 38 in which the ball 36 may be engaged to lock the shaft against movement. The forward end of this shaft may be connected through medium of a link 39 with a suitable operating lever 40 located adjacent the driver's seat.

From the foregoing it is believed to be obvious that by the use of apparatus constructed in accordance with this invention the desired results may be attained without in any manner altering the construction of either the transmission or differential, the mechanism described being in fact capable of application to the torque tube at present employed with vehicles of this character without in any manner altering the structure of the same except to provide a seat for the bearing 25. It will furthermore be obvious that such structure hereinbefore set forth is capable of some change and modification without materially departing from the spirit of our invention and we accordingly do not limit ourselves to the specific structure thereof except as hereinafter claimed.

We claim:—

1. In a device of the type described, the combination with a vehicle embodying a differential housing having a forwardly extended tubular portion provided with a bearing, and a torque tube secured to the forward end of such tubular portion, of a shaft formed in two sections, one of which is rotatably mounted within said bearing and has an enlarged portion extending into the torque tube, the other section of the shaft having its rear end rotatably mounted in said enlargement, a block slidably mounted upon the last named section of the shaft and provided upon its rear face with clutch teeth, said enlargement being provided upon its front face with clutch teeth adapted to coact with the clutch teeth of said block, means extending through the wall of the torque tube for shifting said block, including a yoke secured upon the outer surface of the torque tube and having a recess, the torque tube having an opening aligning with the recess of the yoke, a shaft slidably mounted in the front wall of the yoke, and a shifting fork engaged with the rear end of the last named shaft and engaging within a groove formed in said block.

2. In a device of the type described, the combination with a vehicle embodying a differential housing having a forwardly extending tubular portion provided with a bearing, a torque tube secured to the forward end of said tubular portion and provided at a point spaced therefrom with a bearing, a shaft formed in two sections, one of which is rotatably mounted within the bearing of the tubular portion and has an enlargement extending into the torque tube, said enlargement being provided with a bore, the other section of the shaft being rotatably mounted in the bearing of the torque tube and having its rear end rotatably engaged in the bore of the enlargement, the forward end of the enlargement being provided with clutch teeth, a block splined to the last named section of the shaft forwardly of the enlargement and provided upon its rear face with clutch teeth adapted to coact with the clutch teeth of said enlargement, and means for shifting said block extending through the wall of the torque tube.

In testimony whereof we hereunto affix our signatures.

JACOB YOUNG.
MERTON L. FRAKES.